Aug. 2, 1949.  W. HUNGATE  2,477,607
METHOD OF FORMING INTERLOCKING SLOTS IN FASTENERS
Filed April 16, 1943
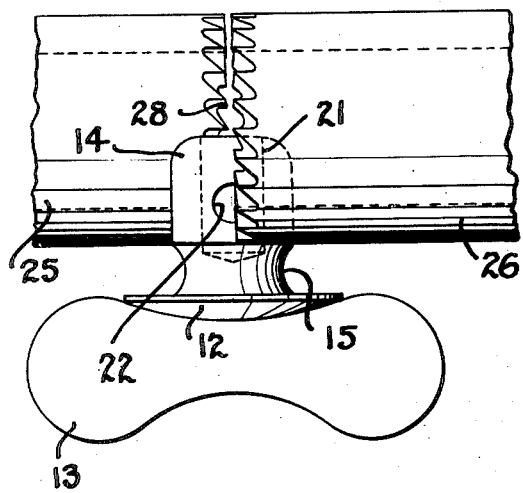
Fig. 1.
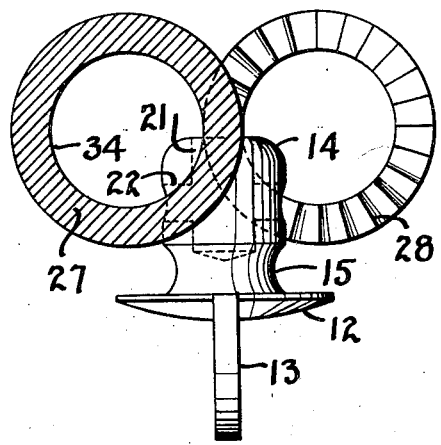
Fig. 2.
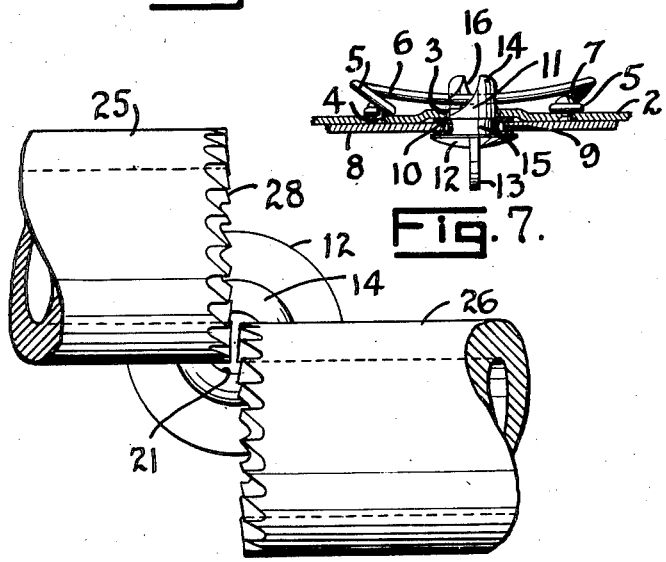
Fig. 3.
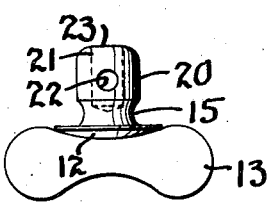
Fig. 7.
Fig. 4.
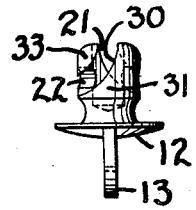
Fig. 6.
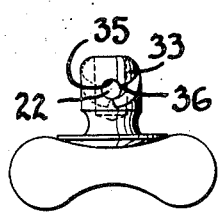
Fig. 5.
INVENTOR.
W^m. HUNGATE
BY Lester B. Clarke
ATTORNEY Patented Aug. 2, 1949

2,477,607

UNITED STATES PATENT OFFICE 2,477,607

METHOD OF FORMING INTERLOCKING SLOTS IN FASTENERS

William Hungate, Houston, Tex.

Application April 16, 1943, Serial No. 483,255

1 Claim. (Cl. 29—148)

The invention relates to a method of milling or cutting grooved slots in a cylindrical, tubular, or other member.

While it is intended that the invention may be applied in various arts, the present explanation will be given as particularly applied to the groove slotting of a detachable locking fastener of the type utilized in affixing plates together, such as, the sheeting applied to aircraft and for like purposes where a latching or locking action is obtained.

It is understood that the prior practices of cutting a small curved slot was to advance a tubular member axially against a small diameter rotating milling cutter so that the periphery of the mill cut into the tubular member and as the tubular member was advanced, it was turned to cut the grooved slotting desired. Such an operation was slow and expensive due to the small diameter of the milling cutter and due to the fact that the movement of the tubular member had to be slow because of the unsupported span of the drill.

The present invention contemplates a high speed means and method of curved slotting fasteners by drilling an axial bore in the fastener and then intersecting such bore with a transversely drilled bore and thereafter connecting these two bores by a curved slot cut with a hollow annular end milling cutter in such a manner that the two opposite curved slots could be cut simultaneously by the advance of the respectively offset hollow end milling cutters simultaneously from opposite sides.

It is one of the objects of the invention therefore, to cut a curved slot in the cylindrical member by advancing a segment of an annular milling cutter against the periphery of the cylindrical member so as to cut a grooved arc or slot therein.

Another object of the invention is to advance two hollow milling cutters from opposite directions and in an offset position relative to each other against the sides of a cylindrical member in order to effect a grooved slotting thereof.

Another object of the invention is to provide a slot transversely of a member which slot follows a curved path in the member by advancing a pair of rotating hollow annular end cutters laterally against the member.

Another object of the invention is to drill a member in an axial and transverse direction and to then connect the two bores thus formed with a curved slot.

Another object is to simultaneously cut a pair of curved complementary slots in a cylindrical member by advancing a pair of hollow milling cutters against the member.

Other and further objects of the invention will be readily apparent when the following description is considered in connection with the accompanying drawings wherein:

Fig. 1 is a top view looking at a tubular member being slotted by advancing of the end milling cutters from opposite directions.

Fig. 2 is a transverse section taken through one of the milling cutters of Fig. 1, to illustrate the offset position of the cutters.

Fig. 3 is a side elevation of the fastener and cutters.

Fig. 4 illustrates one of the rivet blanks which has been drilled axially and transversely but not slotted.

Figs. 5 and 6 show side and edge views of the fastener which has been slotted.

Fig. 7 is a transverse assembly of two plate structures latched together with one of the locking fasteners.

The invention will be described as applied to a fastener utilized in the manner shown in Fig. 7 where an inside plate or support member 2 has had an opening 3 made therein. Disposed on opposite sides of this opening are the rivets or supporting members 4 which secure the ends 5 of a spring wire 6 in position. This wire may have the coils 7 so as to give it sufficient resiliency. There are many applications of this sort where an outer plate or member 8 is to be affixed to a support plate or member 2 as seen in Fig. 7. The plate 8 has the opening 9 therein, and may have a grommet or sealing ring 10 in such opening. The fastener 11 may be formed with a head 12, the wing piece 13, and the shank 14 may be provided with an annular recess 15 to interfit with the grommet 10.

The shank 14 is formed with an open ended cross slot which is twisted and curves around in the shank for substantially a quarter turn. In this manner, as the fastener is inserted through the openings 3 and 9 the entrance to the slot 16 will straddle the wire 6 whereupon turning of the fastener in a clock-wise direction as viewed in Fig. 7 will cause the wire to be pulled in by the curvature of the slot in the fastener to the depressed position seen in Fig. 7. Thus, the wire 6 is placed under tension bearing on the shank of the fastener so as to hold the head 12 against the plate 8, and in this manner, firmly clamp the plate 8 to the support 2. This type of joint may be termed a curved bayonet joint or curved J latch both of which terms have been used as applied to slotted joints.

Fasteners having slots of this sort have been heretofore manufactured by rotating a peripheral milling cutter against the end of the rivet and rotating the fastener as it advances so that the cut will follow along the desired curve. Such operation is slow and tedious because of the small diameter of the milling cutter, and the present invention contemplates a method and apparatus of cutting the slot 16 on a high speed production basis.

In the present invention, a blank such as 20 in Fig. 4 is first provided with an axial bore 21 formed by drilling into the end of the blank as seen in dotted lines in Fig. 4. Then, a transverse bore 22 is formed intersecting the bore 21 and spaced inwardly of the end 23 of the blank a distance which is slightly less than the depth of the slot 16. When these two operations have been performed, then the blank is placed in a suitable supporting device in such position that the end milling cutters 25 and 26 of Fig. 1 can be advanced against it from opposite sides in an offset relationship as best seen in Fig. 3.

Each of these end milling cutters constitutes a hollow annular cylindrical member 27 whose end is provided with the cutting teeth 28. These cutters are of such diameter that an arc or segment thereof is of the same radius as is the curvature of the slot 16. The cutters are offset so that the opposite sides thereof over-lap a distance equal to the thickness of the wall of the cutter, which is, the thickness of the slot to be cut, as best seen in Fig. 3. When the two cutters are thus simultaneously advanced either manually or automatically, each cutter will cut an arc or segment 30 as seen in Fig. 6. This slot or segment of the cut starts at the periphery 31 of the blank and will extend inwardly normal to a plane formed by the axes of the bores 21 and 22. The teeth 28 of the cutters move into the blank far enough to intersect the bores 21 and 22. In this manner, the lugs or projections 33 remain on the blank uncut because they constitute material which entered into the internal opening 34 in each of the annular cutters. It will be noted in Fig. 5 that the periphery 35 of the transverse bore 22 forms a depression toward the entering end of the fastener.

This slight outward depression provides a shoulder 36 which is adapted to retain the wire 6 and lock or latch it in the depression to prevent loosening or release of the fastener except when such turning force is applied to it in a reverse or counter-clockwise direction so as to cause the wire to move back into the slot 16 in the manner of a bayonet or J latch. In view of the fact that the cutters 25 and 26 are offset with respect to each other and with respect to the axis of the shank 14, it seems obvious that the opposite arcuate slots 30 will be intercommunicating due to the fact that the material in the center of the blank was cut away in forming the bores 21 and 22.

It seems obvious that in view of the fact that the end milling cutters 25 and 26 can be very sturdy and husky in construction since the width of the cut or slot being made is substantial as compared with the diameter of the blank, that they can be forced with considerable power against the sides of the shank 14 thus performing their cutting action very rapidly. The operation therefore lends itself to an automatically operating machine which will cut the oppositely curved segments quickly and economically. The rate of operation of the machine constructed with the foregoing description, would be limited principally by the speed at which the blanks could be inserted between the two end cutters as they are moved rapidly towards and away from each other. It is contemplated that an automatic machine may cut as many as 50 fasteners per minute.

While the invention has been described as applied to a locking fastener, it seems obvious that it could be of advantage in cutting any curved slot which would be a segment of a circle.

Broadly, the invention contemplates a means and method of high speed curved slotting.

What is claimed is:

A method of forming an interlocking slot in a fastener or like member so as to lock such member to a cross piece which comprises drilling a longitudinal bore therein of a length at least equal to the depth of the slot, intersecting such bore with a transverse bore at a point slightly less than the depth of the longitudinal bore, and cutting a pair of curved slots which are an arc of a circle to intersect the entrance to each bore so that the slots thus cut provide a passage for the cross piece to move into the end of the slots and into said transverse bore, said slots cutting into said transverse bore below the periphery thereof so as to provide a latching shoulder to normally retain the fastener against release.

WILLIAM HUNGATE.

REFERENCES CITED

The following references are of record in the file of this patent:

UNITED STATES PATENTS

| Number | Name | Date |
| --- | --- | --- |
| 1,039,915 | Faber | Oct. 1, 1912 |
| 1,498,231 | Carter | June 17, 1924 |
| 1,643,474 | Simmons | Sept. 27, 1927 |
| 1,831,973 | Schwaar | Nov. 17, 1931 |
| 1,955,740 | Dzus | Apr. 24, 1934 |
| 1,986,329 | Dzus | Jan. 1, 1935 |
| 2,029,388 | Richardson et al. | Feb. 4, 1936 |
| 2,109,969 | Dzus | Mar. 1, 1938 |
| 2,147,243 | Cornell | Feb. 14, 1939 |
| 2,148,577 | Platt | Feb. 28, 1939 |
| 2,160,298 | Weber | May 30, 1939 |
| 2,242,487 | Swanson | May 20, 1941 |